(12) United States Patent
Chang et al.

(10) Patent No.: US 10,687,289 B2
(45) Date of Patent: Jun. 16, 2020

(54) METHOD AND APPARATUS FOR SECONDARY SYNCHRONIZATION IN INTERNET OF THINGS

(71) Applicant: ELECTRONICS AND TELECOMMUNICATIONS RESEARCH INSTITUE, Daejeon (KR)

(72) Inventors: Kapseok Chang, Daejeon (KR); Moon-Sik Lee, Daejoen (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 130 days.

(21) Appl. No.: 15/670,181

(22) Filed: Aug. 7, 2017

(65) Prior Publication Data

US 2018/0041976 A1 Feb. 8, 2018

(30) Foreign Application Priority Data

Aug. 8, 2016 (KR) .................. 10-2016-0100911
Sep. 21, 2016 (KR) .................. 10-2016-0120945
Aug. 2, 2017 (KR) .................. 10-2017-0098210

(51) Int. Cl.
*H04W 56/00* (2009.01)
*H04J 13/00* (2011.01)
(Continued)

(52) U.S. Cl.
CPC ....... *H04W 56/001* (2013.01); *H04J 11/0079* (2013.01); *H04J 13/0062* (2013.01);
(Continued)

(58) Field of Classification Search
CPC .................. H04J 13/0062; H04W 56/001
See application file for complete search history.

(56) References Cited

U.S. PATENT DOCUMENTS

2008/0233966 A1* 9/2008 Scheim ................ H04L 5/0023
455/452.1
2009/0290555 A1* 11/2009 Alpert ................ H04W 36/30
370/331
(Continued)

FOREIGN PATENT DOCUMENTS

KR 10-1302462 B1 9/2013

OTHER PUBLICATIONS

Ericsson, "NB-IoT—NSSS Design", 3GPP TSG RAN WG1 Meeting #84-bis, R1-162775, Busan, Korea, Apr. 11-15, 2016.
(Continued)

*Primary Examiner* — Khaled M Kassim
*Assistant Examiner* — Syed Ali
(74) *Attorney, Agent, or Firm* — LRK Patent Law Firm

(57) ABSTRACT

A method and an apparatus for secondary synchronization in the Internet of things. The receiving apparatus extracts a frequency domain sample by applying channel estimation to a time domain sample of the secondary synchronization signal. Further, the receiving apparatus estimates a physical cell ID (PCI) and 80 ms frame timing (FT) based on decorrelation between a frequency domain standard signal of the secondary synchronization signal and the frequency domain sample.

12 Claims, 7 Drawing Sheets

(51) Int. Cl.
    *H04L 5/00*       (2006.01)
    *H04L 27/26*     (2006.01)
    *H04J 11/00*     (2006.01)
    *H04W 48/16*     (2009.01)
    *H04W 72/04*     (2009.01)

(52) U.S. Cl.
    CPC .......... *H04L 5/0007* (2013.01); *H04L 5/0053* (2013.01); *H04L 27/2656* (2013.01); *H04L 27/2613* (2013.01); *H04L 27/2672* (2013.01); *H04L 27/2675* (2013.01); *H04W 48/16* (2013.01); *H04W 72/042* (2013.01)

(56) References Cited

U.S. PATENT DOCUMENTS

| | | | |
|---|---|---|---|
| 2013/0094457 | A1 | 4/2013 | Seo et al. |
| 2014/0233457 | A1* | 8/2014 | Koutsimanis .......... H04J 11/005 370/328 |
| 2014/0293853 | A1 | 10/2014 | Cho et al. |
| 2016/0262123 | A1 | 9/2016 | Abedini et al. |
| 2017/0135052 | A1* | 5/2017 | Lei ...................... H04J 13/0062 |
| 2017/0311276 | A1* | 10/2017 | Tsai ...................... H04B 7/0617 |
| 2019/0281587 | A1* | 9/2019 | Zhang ........................ H04L 1/00 |
| 2019/0297545 | A1* | 9/2019 | Ramachandra ............................ H04W 36/00835 |
| 2019/0319764 | A1* | 10/2019 | Nader ............... H04W 72/0453 |
| 2020/0037186 | A1* | 1/2020 | Thangarasa ........... H04L 1/1812 |
| 2020/0059337 | A1* | 2/2020 | Yamada ................ H04L 5/0051 |

OTHER PUBLICATIONS

Ericsson, "Narrowband LTE—Synchronization Channel Design and Performance", 3GPP R1-156009, Oct. 5-10, 2015
Intel Corporation, "On device complexity for NB-IoT", 3GPP R1-156524, Nov. 16-20, 2015.
Intel Corporation, "On synchronization signal design and performance for NB-IoT", 3GPP R1-156528, Nov. 16-20, 2015.

* cited by examiner

METHOD AND APPARATUS FOR SECONDARY SYNCHRONIZATION IN INTERNET OF THINGS

CROSS-REFERENCE TO RELATED APPLICATIONS

This application claims priority to and the benefit of Korean Patent Application Nos. 10-2016-0100911, 10-2016-0120945 and 10-2017-0098210, filed in the Korean Intellectual Property Office on Aug. 8, 2016, Sep. 21, 2016 and Aug. 2, 2017, respectively, the entire contents of which are incorporated herein by reference.

BACKGROUND OF THE INVENTION

1. Field of the Invention

The present invention relates to a method and apparatus for secondary synchronization in the internet of things.

2. Description of Related Art

There is a wireless communication system providing the Internet service of things over a wide area at low power and cost, based on an orthogonal frequency division multiplexing (OFDM) transmission scheme. The wireless communication system has supported various modes such as a stand-alone operating mode, an in-band operating mode, and a guard band operating mode for general purpose.

The standalone operating mode is a mode that operates a signal for providing the internet service of things in a frequency band used in global system for mobile communication (GSM). The in-band operating mode is a mode that operates a signal for providing the Internet service of things in at least one of available resource blocks (RBs) within a frequency band used in the existing long term evolution (LTE) system. The guard band operating mode is a mode that operates a signal for providing the Internet service of things in at least one of non-available RBs within the frequency band used in the existing LTE system.

The wireless communication system transmits a secondary synchronization signal in a last subframe of even numbered frames to acquire a physical cell ID (PCI) and 80 ms frame timing (FT) regardless of the three operating modes described above.

Describing in more detail, one frame consists of ten subframes, a narrowband secondary synchronization signal (NSSS) is transmitted in the last subframe of the even numbered frames. Further, a narrowband physical broadcast channel (NPBCH) is transmitted in a first subframe of each frame. The NPBCH repeatedly transmits the same broadcasting information in units of 80 ms. The NSSS includes one of 504 PCI information, and the information remains unchanged if a serving cell is established. Further, to acquire the information on a start frame of the NPBCH repeated every 80 ms (i.e., to acquire 80 ms FT), the NSSS contains different 80 ms FT information in units of a frame to which four NSSSs are allocated. In other words, an FT0 sequence for the 80 ms FT is transmitted in a first frame consisting of four frames by being included in the NSSS and an FT1 sequence is transmitted in a second frame by being included in the NSSS. An FT2 sequence is transmitted in a third frame by being included in the NSSS. Finally, an FT3 sequence is transmitted in a fourth frame by being included in the NSSS. As such, different FT sequences are transmitted to acquire start frame information of the 80 ms FT.

To carry the PCI and the 80 ms FT information described above, an NSSS signal of a frequency domain is configured in a mathematical multiplication form of different two sequences for the PCI by the FT sequence for the 80 ms FT. To obtain desired information by receiving the NSSS configured as described above, a very complicated decorrelation process is basically required, which leads to increase battery consumption of a receiving apparatus. The complicated decorrelation process may be inappropriate for the wireless communication system that aims to provide the Internet of things service to a wide area for a long time.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for secondary synchronization having advantages of effectively acquiring PCI and 80 ms FT in the Internet of things.

An exemplary embodiment of the present invention provides a method for acquiring, by a receiving apparatus, synchronization in the Internet of things, based on a secondary synchronization signal received from a transmitting apparatus. The method may include extracting a frequency domain sample by applying channel estimation to a time domain sample of the secondary synchronization signal; and estimating a physical cell ID (PCI) and frame timing (FT) based on decorrelation between a frequency domain standard signal of the secondary synchronization signal and the frequency domain sample.

The estimating may include: calculating a first value by performing decorrelation between Fourier series (FS) sequences included in the frequency domain standard signal and the frequency domain sample; calculating a second value by performing decorrelation between a Zadoff Chu (ZC) sequence included in the frequency domain standard signal and the first value; calculating a third value by performing decorrelation between a scrambling sequence included in the frequency domain standard signal and the second value; and estimating the PCI and the FT using the first value, the second value, and the third value.

The estimating may further include calculating a fourth value by performing cyclic shift (CS) combining on the third value.

The estimating of the PCI and the FT may include estimating the PCI and the FT using the first to fourth values.

The first value may be calculated only by sign conversion instead of a multiplication operation and the third value may be calculated only by the sign conversion instead of the multiplication operation.

After the calculating of the first value, the calculating of the second value, the calculating of the third value, and the calculating of the fourth value are repeatedly performed by the accumulated number of times, the estimating of the PCI and the FT may be performed.

The estimating may include: estimating a first value by performing decorrelation between a first FS sequence among Fourier series (FS) sequences included in the frequency domain standard signal and the frequency domain sample; estimating a second value by performing decorrelation between a second sequence among the FS sequences and the frequency domain sample; estimating a third value by performing decorrelation between a third sequence among the FS sequences and the frequency domain sample; estimating a fourth value by performing decorrelation between a fourth sequence among the FS sequences and the frequency domain sample; and estimating the PCI and the FT by comparing the first to fourth values.

The extracting may include: removing a cyclic prefix (CP) from the time domain sample; down-sampling a sample from which the CP is removed; and performing fast Fourier transform (FFT) on the down-sampled sample.

The FT may be 80 ms FT.

Another embodiment of the present invention provides a method for acquiring, by a terminal, synchronization in the Internet of things, based on a secondary synchronization signal received from a base station. The method may include: extracting a frequency domain sample from a time domain sample of the secondary synchronization signal; and estimating a physical cell ID (PCI) and 80 ms frame timing (FT) based on decorrelation between a sequence included in a frequency domain standard signal of the secondary synchronization signal and the frequency domain sample.

The estimating may include: calculating a first value by performing decorrelation between Fourier series (FS) sequences included in the frequency domain standard signal and the frequency domain sample; calculating a second value by performing decorrelation between a Zadoff Chu (ZC) sequence included in the frequency domain standard signal and the first value; calculating a third value by performing decorrelation between a scrambling sequence included in the frequency domain standard signal and the second value; calculating a fourth value by performing cyclic shift (CS) combining on the third value; and estimating the PCI and the FT by using the first to fourth values.

After the calculating of the first value, the calculating of the second value, the calculating of the third value, and the calculating of the fourth value are repeatedly performed by the accumulated number of times, the estimating of the PCI and the FT may be performed.

The first value may be calculated only by an addition calculation instead of a multiplication operation, and the third value may be calculated only by an addition calculation instead of the multiplication operation.

Yet another exemplary embodiment of the present invention provides a receiving apparatus. The receiving apparatus may include: an analog-digital converter sampling a secondary synchronization signal received from a transmitting apparatus into a digital signal to generate a first sampling signal: a filter unit filtering the first sampling signal; and a synchronization detector extracting a frequency domain sample by performing channel estimation on the filtered first sampling signal and estimating a physical cell ID (PCI) and 80 ms frame timing (FT) based on decorrelation between the frequency domain standard signal of the secondary synchronization signal and the frequency domain sample.

The synchronization detector may calculate a first value by performing decorrelation between Fourier series (FS) sequences included in the frequency domain standard signal and the frequency domain sample, calculate a second value by performing decorrelation between a Zadoff Chu (ZC) sequence included in the frequency domain standard signal and the first value, calculate a third value by performing decorrelation between a scrambling sequence included in the frequency domain standard signal and the second value and calculate a fourth value by performing a cyclic shift (CS) combining on the third value, and estimate the PCI and the FT by using the first to fourth values.

The synchronization detector may repeatedly calculate the first to fourth values by a predetermined accumulated number of times and then estimate the PCI and the FT.

The first value may be calculated only by an addition calculation instead of a multiplication operation, and the third value may be calculated only by an addition calculation instead of the multiplication operation.

The synchronization detector may include: a first estimator estimating a first value by performing decorrelation between a first FS sequence among Fourier series (FS) sequences included in the frequency domain standard signal and the frequency domain sample; a second estimator estimating a second value by performing decorrelation between a second sequence among the FS sequences and the frequency domain sample; a third estimator estimating a third value by performing decorrelation between a third sequence among the FS sequences and the frequency domain sample; a fourth estimator estimating a fourth value by performing decorrelation between a fourth sequence among the FS sequences and the frequency domain sample; and a selector estimating the PCI and the FT by comparing the first to fourth values.

The synchronization detector may remove a cyclic prefix (CP) from the first sampling signal, down-sample a sample from which the CP is removed; and perform fast Fourier transform (FFT) on the down-sampled sample to extract the frequency domain sample.

According to an exemplary embodiment of the present invention, it is possible to acquire the PCI and the 80 ms FT with a smaller number of operations by reducing the complex operation. By doing so, according to the exemplary embodiment of the present invention, it is possible to effectively implement the receiving apparatus of the Internet of things with low power.

DETAILED DESCRIPTION OF THE EMBODIMENTS

Figure 1:
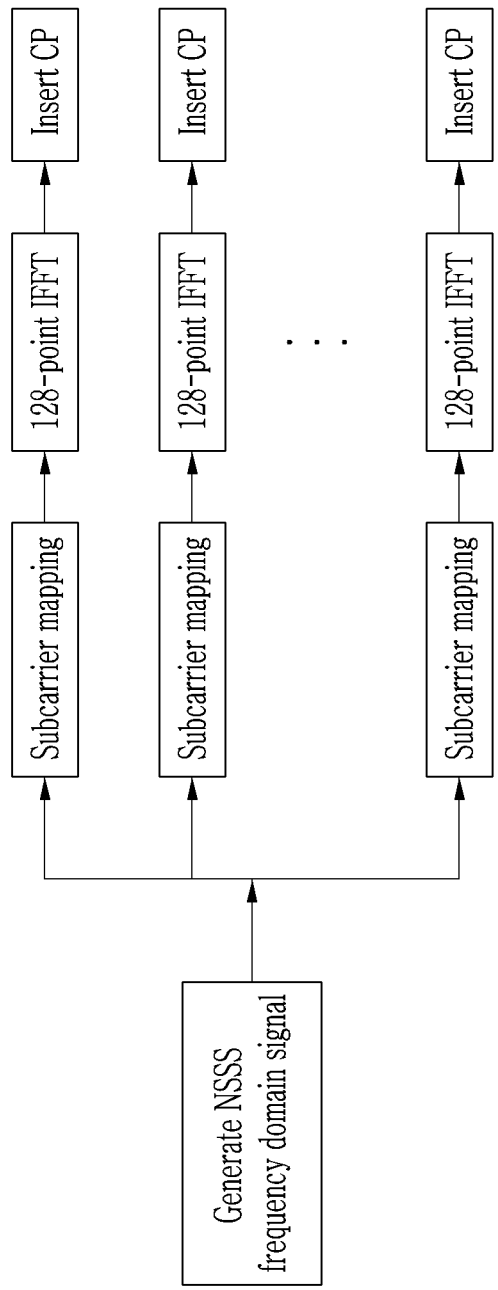
FIG. 1 is a flow chart illustrating a method for generating an NSSS signal in a standalone operating mode according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a receiving apparatus may refer to a terminal, a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like and may include all or some of functions of the terminal, the MT, the AMS, the HR-MS, the SS, the PSS, the AT, the UE, and the like Further, a transmitting apparatus may refer to a base station (BS), an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) serving as a base station, a high reliability relay station (HR-RS) serving as a base station, and the like and may also include all or some of functions of the BS, the ABS, the nodeB, the eNodeB, the AP, the RAS, the BTS, the MMR-BS, the RS, the HR-RS, and the like.

First, a method for generating a narrowband secondary synchronization signal (NSSS) frequency domain signal according to an exemplary embodiment of the present invention will be described.

The NSSS frequency domain signal ($s_{u,q,p}(n)$) may be configured of a combination of a cyclically-extended length-132 Zadoff Chu (ZC) sequence (DeletedTexts), a cyclically-extended length-132 binary Hadamard sequence (DeletedTexts), and a Fourier series (FS) sequence (DeletedTexts). That is, the NSSS frequency domain signal may be defined as the following Equation 1.

$$s_{u,q,p}(n) = \beta_u(n) b_q(n) \rho_p(n), n=0,1,\ldots,131 \quad \text{Equation 1}$$

In the above Equation 1, a cyclic shift index p is applied to the NSSS signal located in a last subframe of a (8 k+2p)-th frame, where $0 \leq k \leq 127$. In addition, the ZC sequence ($\beta_u(n)$) may be defined as the following Equation 2.

$$\beta_u(n) = \exp\left(\frac{-j\pi u \bmod(n, 131)(\bmod(n, 131)+1)}{131}\right), \quad \text{Equation 2}$$
$$u = 3, 4, \ldots, 128$$

In addition, a scrambling sequence ($b_q(n)$) may be defined as the following Equation 3.

$$b_q(n) = \text{Hadamard}_{s_q}^{128 \times 128}(\bmod(n,128)), q=0,1,2,3 \quad \text{Equation 3}$$

In the above Equation 3, $s_0=0$, $s_1=31$, $s_2=63$, $s_0=127$. Accordingly, $b_q(n)$ is as the following Table 1.

| q | $b_q(0) \ldots b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 -1 -1 1 -1 1 1 -1 -1 1 1 -1 1 -1 -1 1 -1 1 1 -1 1 -1 -1 1 1 -1 -1 1 -1 1 1 -1 -1 1 1 -1 1 -1 -1 1 1 -1 -1 1 -1 1 1 -1 1 -1 -1 1 -1 1 1 -1 -1 1 1 -1 1 -1 -1 1 1 -1 -1 1 -1 1 1 -1 -1 1 1 -1 1 -1 -1 1 -1 1 1 -1 1 -1 -1 1 1 -1 -1 1 -1 1 1 -1 -1 1 1 -1 1 -1 -1 1 1 -1 -1 1 -1 1 1 -1 1 -1 -1 1 -1 1 1 -1 -1 1 1 -1 1 -1 -1 1] |
| 2 | [1 -1 -1 1 1 -1 -1 1 1 -1 -1 1 1 -1 -1 1 -1 1 1 -1 -1 1 1 -1 -1 1 1 -1 -1 1 1 -1 -1 1 1 -1 -1 1 1 -1 -1 1 1 -1 -1 1 1 -1 1 -1 -1 1 1 -1 -1 1 1 -1 -1 1 1 -1 -1 1 -1 1 1 -1 -1 1 1 -1 -1 1 1 -1 -1 1 1 -1 1 -1 -1 1 1 -1 -1 1 1 -1 -1 1 1 -1 -1 1 1 -1 -1 1 -1 1 1 -1 -1 1 1 -1 -1 1 1 -1 -1 1 1 -1 -1 1 -1 1 1 -1 -1 1 1 -1 -1 1 1]  |
| 3 | [1 -1 -1 1 -1 1 1 -1 -1 1 1 -1 1 -1 -1 1 -1 1 1 -1 1 -1 -1 1 1 -1 -1 1 -1 1 1 -1 -1 1 1 -1 1 -1 -1 1 1 -1 -1 1 -1 1 1 -1 1 -1 -1 1 -1 1 1 -1 -1 1 1 -1 1 -1 -1 1 1 -1 -1 1 -1 1 1 -1 -1 1 1 -1 1 -1 -1 1 -1 1 1 -1 1 -1 -1 1 1 -1 -1 1 -1 1 1 -1 -1 1 1 -1 1 -1 -1 1 1 -1 -1 1 -1 1 1 -1 1 -1 -1 1 -1 1 1 -1 -1 1 1 -1 1 -1 -1 1]. |

In addition, the FS sequence ($\rho_p(n)$) may be defined as the following Equation 4.

$$\rho_p(n) = \exp\left(\frac{-j2\pi l_p n}{132}\right), p = 0, 1, 2, 3 \quad \text{Equation 4}$$

In the above Equation 4, $l_0=0$, $l_1=33$, $l_2=66$, $l_3=99$. Accordingly, $\rho_p(n)$ is as the following Table 2.

TABLE 2

| p | $p_y(0) \ldots p_y(131)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 -j -1 j 1 j] |
| 2 | [1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1 1 -1] |
| 3 | [1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j 1 j -1 -j] |

Meanwhile, a mapping function of mapping the physical cell ID (PCI) to indexes u and p may be defined as the following Equation 5.

$$u = \bmod(PCI, 126) + 3 \text{ and } q = \left\lfloor \frac{PCI}{126} \right\rfloor \quad \text{Equation 5}$$

Providing that the receiving apparatus (i.e., terminal) acquires specific u and q, the PCI corresponding thereto becomes (u−3)+q*126.

In the standalone operating mode, the method for generating an NSSS signal will be described with reference to FIG. 1. Here, the NSSS frequency domain signal ($s_{u,q,p}(n)$) is defined as the above Equation 1.

FIG. 1 is a flow chart illustrating a method for generating an NSSS signal in a standalone operating mode according to an exemplary embodiment of the present invention.

First, a transmitting apparatus generates the NSSS frequency domain signal defined in the above Equation 1 depending on the PCI and the 80 ms FT adopted in a specific transmitting apparatus (i.e., base station).

Next, the transmitting apparatus performs a subcarrier mapping process. The transmitting apparatus segments 132 elements into 11 elements by 12 in order of a large index from a small element index. That is, the transmitting apparatus segments 132 elements into m=0, 1, . . . , 10. The transmitting apparatus generates a total of 128 samples by allocating subcarrier locations {k, n} to 12 elements for each segmented m and the generated sequence element to the symbol m and then performing zero padding. That is, the transmitting apparatus allocates an m-th sequence element to twelve subcarrier locations (n=0, 1, . . . , 11) every m and performs 116 zero padding. Describing in detail, physical subcarrier locations are k=−64, −63, −62, . . . , −1, 0, 1, . . . , 62, 63, logical subcarrier locations are n=0, 1, . . . 0, 10, subcarrier locations to which the sequence element is allocated are {−6,0}, {−5,1}, {−4,2}, . . . , {−1,5}, {0,6}, . . . , {5,11}, and the rest physical subcarrier locations k (=−64, −63, . . . , −7, 6, 7, . . . , 63) are padded with zero. The process is repeatedly performed every symbol m.

The transmitting apparatus performs subcarrier indexing. That is, the transmitting, apparatus performs cyclic shifting by 64. Here, the subcarrier indexing process may be performed by the location exchange between higher subcarrier groups (the number of subcarriers corresponding to the BW of a higher half of the LTE system BW) and lower subcarrier groups (the number of subcarriers corresponding to the BW of a lower half of the LTE system BW).

The transmitting apparatus performs the 128-point inverse fast Fourier transform (IFFT) and then inserts the cyclic prefix (CP). When the CP is inserted, if m=4, a CP length may be 10 and the rest CP length may be 9.

As illustrated in FIG. 1 when the receiving apparatus (terminal) performs analog to digital converter (ADC) sampling on the generated NSSS signal at 1.92 MHz, the number of samples of the NSSS time domain signal may be 1508 (=138+137*10).

In the in-band operating mode, the method for generating an NSSS signal will be described with reference to FIG. 2. Here, the NSSS frequency domain signal ($s_{u,q,p}(n)$) is defined as the above Equation 1.

Figure 2:
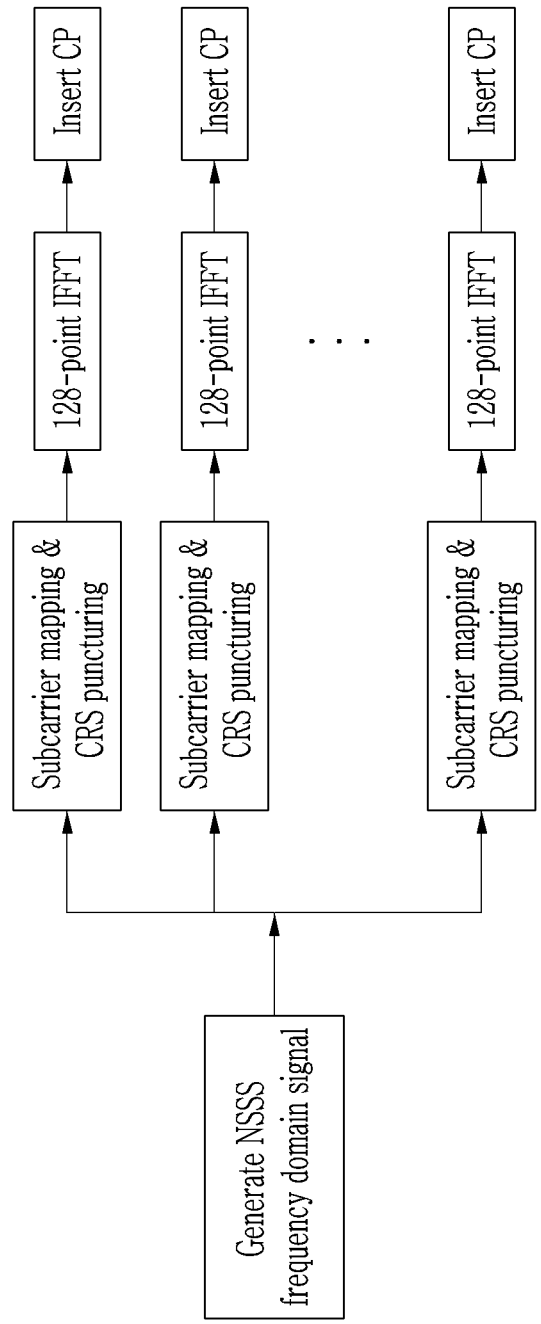
FIG. 2 is a flow chart illustrating a method for generating an NSSS signal in an in-band operating mode according to an exemplary embodiment of the present invention.

FIG. 2 is a flow chart illustrating a method for generating an NSSS signal in an in-band operating mode according to an exemplary embodiment of the present invention.

First, a transmitting apparatus generates the NSSS frequency domain signal defined in the above Equation 1 depending on the PCI and the 80 ms FT adopted in a specific transmitting apparatus (i.e., base station).

Next, the transmitting apparatus performs a subcarrier mapping process. The transmitting apparatus allocates the generated sequence element to the corresponding subcarrier locations {k, n} of the specific physical resource block (RB) and the symbol m in the legacy LTE in-band and then performs the zero padding to generate a total of 128 samples. That is, the transmitting apparatus allocates an m-th sequence element to twelve subcarrier locations ({k,n}={24, 0}, {25,1}, . . . , {34,10}, {35,11}) every m and performs 116 zero padding. Further, the transmitting apparatus performs the puncturing at the subcarrier location to which the legacy cell-specific reference signal (CRS) is allocated not to affect the legacy LTE system.

The transmitting apparatus performs the subcarrier indexing according to the bandwidth (BW) of the legacy LTE system. Here, the subcarrier indexing process may be performed by the location exchange between higher subcarrier groups (the number of subcarriers corresponding to the BW of a higher half of the LTE system BW) and lower subcarrier groups (the number of subcarriers corresponding to the BW of a lower half of the LTE system BW).

The transmitting apparatus performs the 128-point inverse fast Fourier transform (IFFT) and then inserts the cyclic prefix (CP).

As illustrated in FIG. 2, when the receiving apparatus (terminal) performs the analog to digital converter (ADC) sampling on the generated NSSS signal at 1.92 MHz, the number of samples of the NSSS time domain signal may be 1508 (=138+137*10) like the standalone operating mode.

Meanwhile, the method for generating NSSS in a guard band operating mode is identically with the in-band operating mode, except that the physical RB location is in the guard band and the CRS puncturing is not required.

Hereinafter, a method and an apparatus for acquiring PCI and 80 ms FT based on an NSSS signal as described above will be described.

Figure 3:
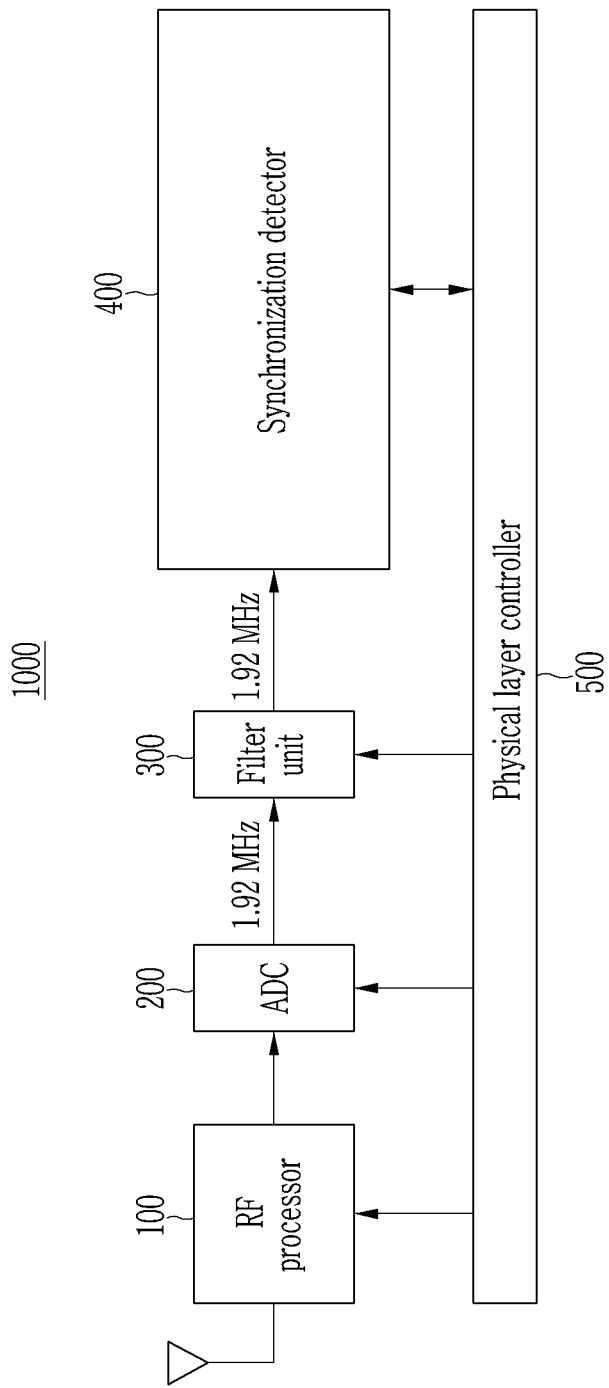
FIG. 3 is a block diagram illustrating a receiving apparatus according to an exemplary embodiment of the present invention.

FIG. 3 is a block diagram illustrating a receiving apparatus 1000 according to an exemplary embodiment of the present invention.

As illustrated in FIG. 3, a receiving apparatus 1000 according to the exemplary embodiment of the present invention includes an RF processor 100, a analog to digital converter (ADC) 200, a filter unit 300, a synchronization detector 400, and a physical layer controller 500.

The RF processor 100 performs RF signal processing on the NSSS signal received from the transmitting apparatus. The RF signal processing may include a function of amplifying a signal while removing noise, an automatic frequency control (AFC) function, and a function of performing bandpass filtering on an RB band on which an NSSS signal is carried.

The ADC 200 samples an analog signal into a digital signal at a predetermined sampling rate. A bandwidth occupied by an NB-IoT transmission signal is mostly 180 kHz, and therefore the sampling rate may be 1.92 MHz based on Nyquist sampling theorem.

The filter unit 300 performs the baseband filtering on the signal which is input by being sampled at 1.92 MHz from the ADC 200. Since the bandwidth occupied by the NB-IoT transmission signal is 180 kHz, the filter unit 300 may be implemented a low pass filter (LPF) having a bandwidth of 180 kHz. That is, the filter unit 300 filters the physical RB on which the NSSS signal is carried regardless of the system bandwidth (BW) of the transmitting apparatus (e.g., base station), and therefore may have a bandwidth of 180 kHz.

The synchronization detector 400 receives a sampling signal of 1.92 MHz filtered by the physical RB on which the NSSS signal is carried from the filter unit 300, and detects the PCI and the 80 ms FT using the received sampling signal. That is, the synchronization detector 400 detects the PCI and the 80 ms FT using the characteristics of the NSSS frequency domain standard signal transmitted every even numbered frame.

The physical layer controller 500 controls the RF processor 100, the ADC 200, the filter unit 300, and the synchronization detector 400. That is, the physical layer controller 500 controls the overall operation of a physical layer L1. In the following description, the physical layer controller 500 may be interchangeably used with the term 'L1 control'.

Figure 4:
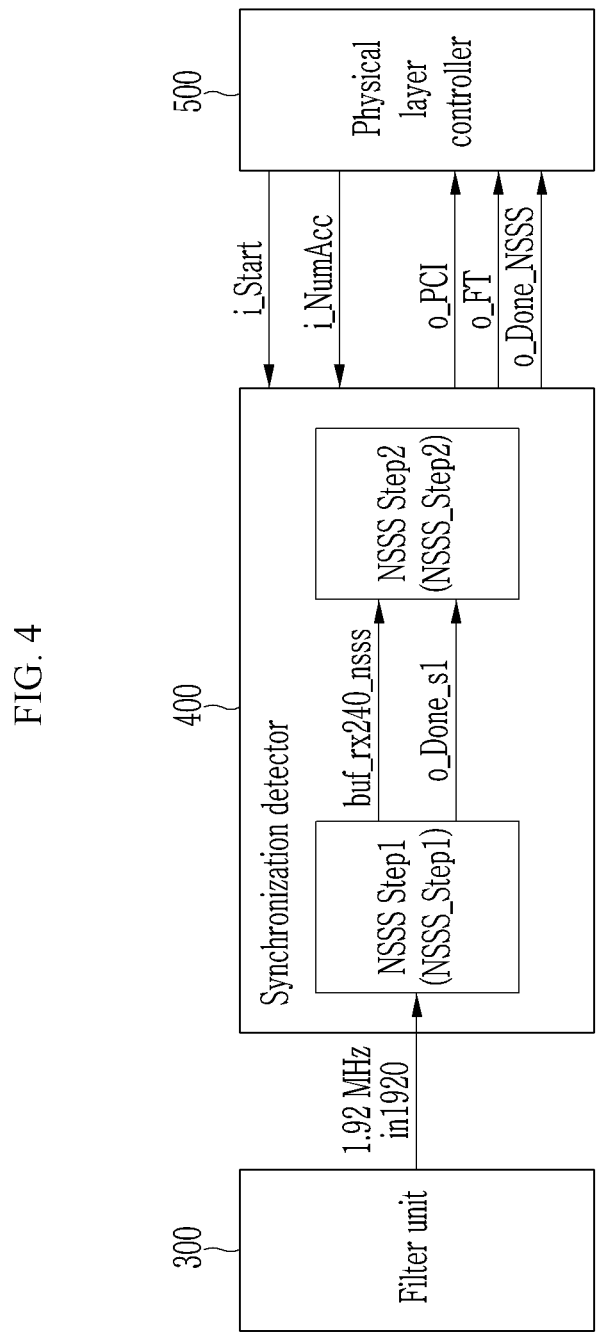
FIG. 4 is a block diagram illustrating a synchronization detector according to an exemplary embodiment of the present invention.

FIG. 4 is a block diagram illustrating the synchronization detector 400 according to an exemplary embodiment of the present invention.

As illustrated in FIG. 4, the synchronization detector 400 according to the exemplary embodiment of the present invention includes a first processor 410 and a second processor 420. The synchronization detector 400 is executed by receiving an enable signal (i_start=ON) from the physical layer controller 500. The first processor 410 may be interchangeably mixed with the term 'NSSS Step1', and the second processor 420 may be interchangeably used with the term 'NSSS Step2'.

The first processor 410 performs channel estimation every 10 ms at a fixed sample timing offset from timing when the enable signal (i_start=ON) is received from the physical layer controller 500. In addition, the first processor 410 performs a frequency domain conversion process and a channel recovering process by receiving samples corresponding to the total number of samples of the NSSS time domain standard signal every 10 ms at the fixed STO from timing when the enable signal is received from the physical layer controller 500, thereby extracting the samples corresponding to the NPSS frequency domain standard signal. Here, the fixed STO means a narrowband primary synchronization signal (NPSS) subframe starting point defined upon the implementation of the receiving apparatus 1000. Here, an NSSS detection window size of the first processor 410 may be 20 ms.

The second processor 420 performs a correlation and accumulation (i_NumAcc) process between the samples extracted by the first processor 410 and the NSSS frequency domain standard signal to acquire the PCI and the 80 ms FT. The second processor 420 transmits the acquired PCI (o_PCI) and 80 ms FT (o_FT) to the physical layer controller 500 and is disabled (o_Done=ON).

The following Table 3 shows an input signal for a functional interface of the synchronization detector 400.

TABLE 3

| Signal Name | Signal Description | Signal Characteristics | | | | |
|---|---|---|---|---|---|---|
| | | Type | Size | Rate | Source | |
| i_Start | NSSS Detector enable strobe | int | [1] | Radio frame | L1 Control | |
| i_NumAcc | Per-20 ms NSSS subframe symbol accumulation num | int | [1] | Radio frame | L1 Control | |
| in1920 | Filtered signal at 1.92 MHz | dcomplx | [1] | Sampling Rate | 180-kHz BW Filter | |

The following Table 4 shows an output signal for the functional interface of the synchronization detector 400.

TABLE 4

| Signal Name | Signal Description | Signal Characteristics | | | | Destination |
|---|---|---|---|---|---|---|
| | | Type | Size | Rate | | |
| o_PCI | Acquired PCI | int | [1] | Radio frame | | L1 Control |
| o_FT | Acquired 80 ms FT from NSSS detector 1st: FS sequence index 2nd: first or second frame | int | [2] | Radio frame | | L1 Control |
| o_Done | NSSS Detector finish strobe | int | [1] | Radio frame | | L1 Control |

Figure 5:
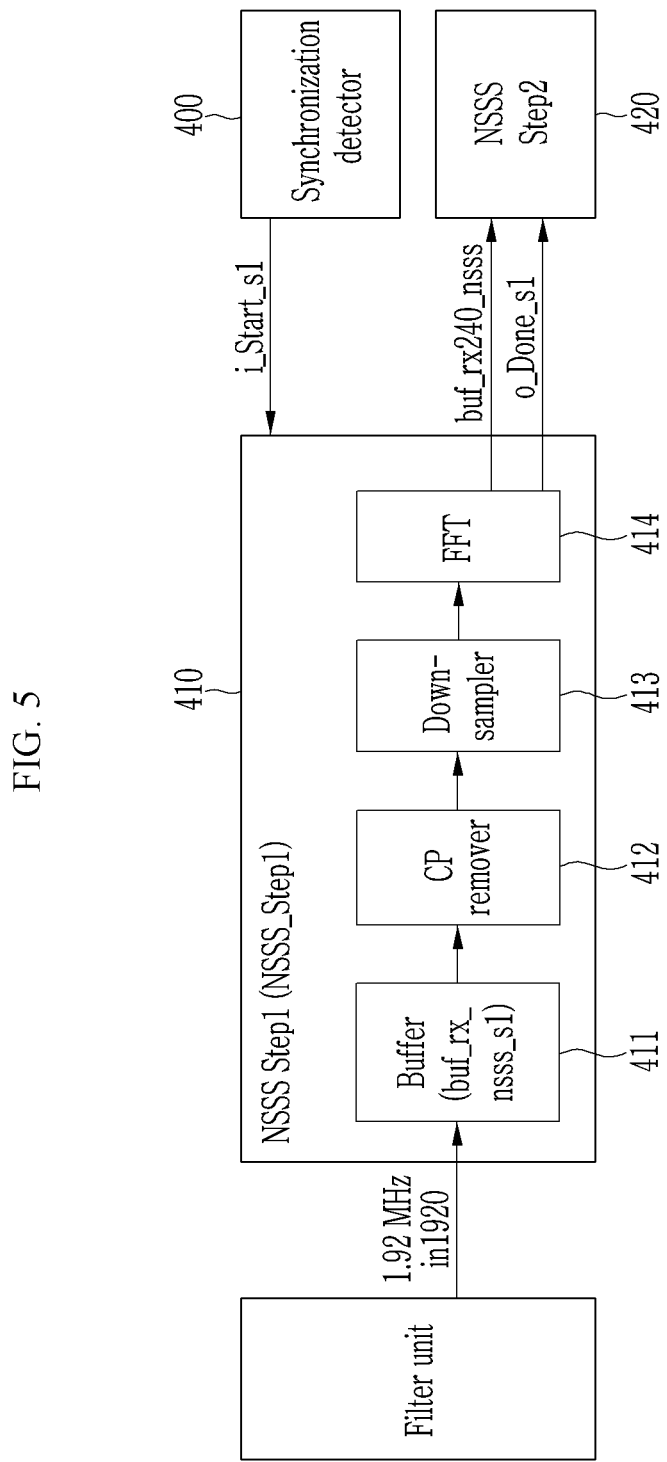
FIG. 5 is a block diagram illustrating a first processor according to an exemplary embodiment of the present invention.

FIG. 5 is a block diagram illustrating the first, processor 410 according to the exemplary embodiment of the present invention. The first processor 410 converts the time domain samples suffering from the NPSS estimation and passing through an automatic frequency control (AFC) into a frequency domain, thereby performing the channel compensation.

As illustrated in FIG. 5, the first processor 410 according to the exemplary embodiment of the present invention includes a buffer 411, a cyclic prefix (CP) remover 412, a down-sampler 413, and fast Fourier transform (FFT) 414. The first processor 410 is performed by receiving i_Start_s1=ON from the synchronization detector 400.

The buffer 411 buffers 1508 samples corresponding to the NPSS time domain standard signal every 10 ms at the fixed STO from the timing when the i_Start_s1=ON is received from the synchronization detector 400. The buffer 411 buffers 1508 samples corresponding to the NSSS time domain standard signal every 10 ms at the fixed STO from the timing when the i_Start_s1=ON is received from the synchronization detector 400. In FIG. 5, the signal buffered by the buffer 411, that is, the signal for the 1508 samples corresponding to the NSSS time domain standard signal is shown by buf_rx_nsss_s1.

The CP remover 412 removes the cyclic prefix (CP). For the 1508 samples stored in the buffer 411, the CP remover 412 performs a process of removing first 9 samples every 137 samples for 137*4 samples, first 10 samples for next 138 samples, and first 9 samples every 137 samples for next 137*6 samples.

The down-sampler 413 down-samples samples from which the CP remover 412 removes the CP. That is, the down-sampler 413 performs 8 times down-sampling, and repeats a process of equivalently catching one sample every 8 samples for 1408 samples from which the CP is removed.

Figure 6:
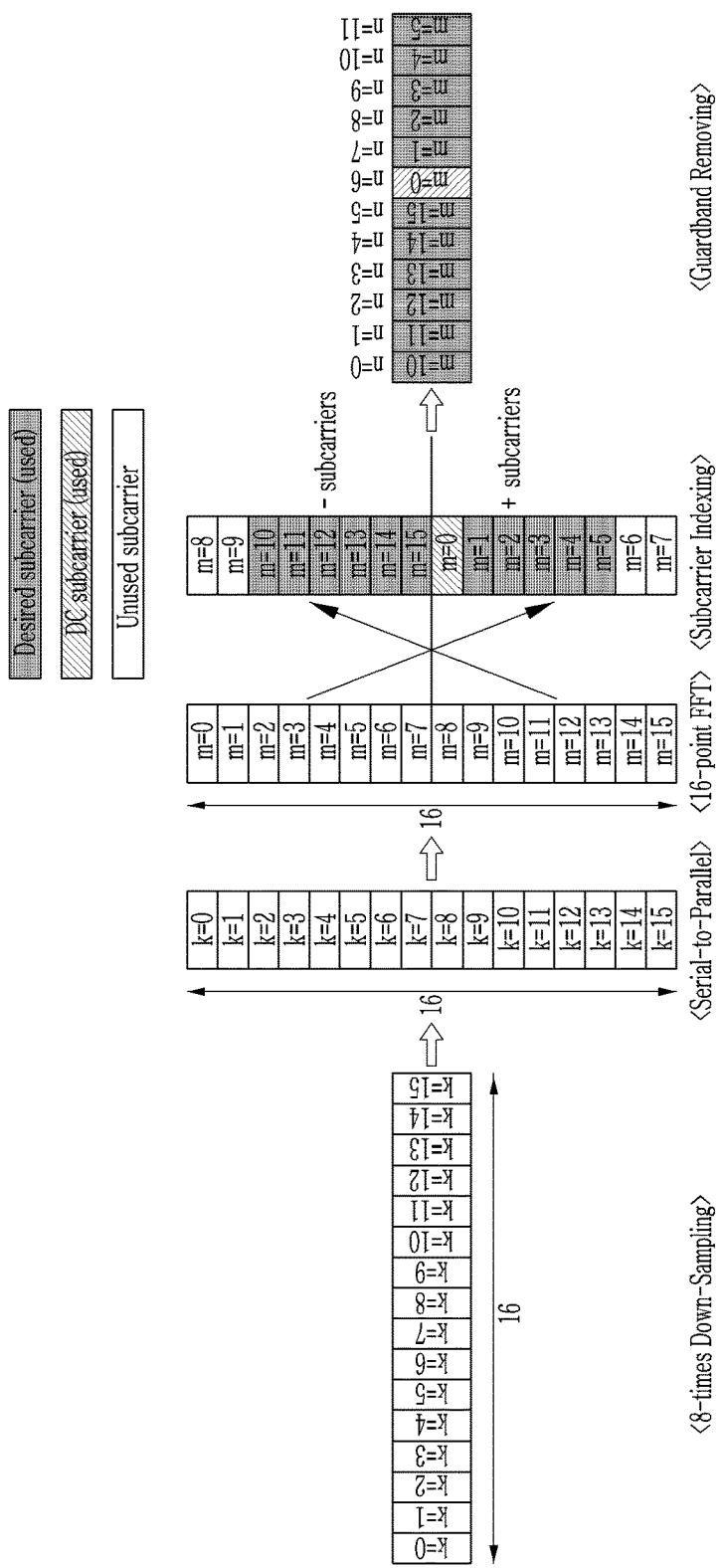
FIG. 6 is a diagram illustrating a process of processing FFT according to the exemplary embodiment of the present invention.

The FFT 414 performs the fast Fourier transform (FFT) on the down-sampled samples. FIG. 6 is a diagram illustrating a process of processing the FFT 414 according to the exemplary embodiment of the present invention. Referring to FIG. 6, the FFT 414 repeatedly performs a subcarrier indexing process and a guard band removing and extracting process after performing a 16-point FFT conversion process every 16 samples for 8 times sampled 176 samples to output 12*11=132 samples (buf_rx240_nsss[•]) corresponding to the NPSS frequency domain standard signal. Meanwhile, as illustrated in FIG. 6, the subcarrier indexing process is an reverse process of the subcarrier indexing in the transmitting apparatus, and the guard band removing process is a process of removing higher two subcarriers and lower two subcarriers.

The FFT 414 transmits 132×2 samples (buf_rx240_nsss [•]) extracted for 20 ms time window to the second processor (SSS Step 2) 420 at a period of 20 ms. The FFT 414 transmits a control signal o_Done_s1=ON to the second processor (NSSS Step2) 420 at an end of each period.

The following Table 5 shows an input signal for a functional interface of the first processor 410.

TABLE 5

| Signal Name | Signal Description | Signal Characteristics | | | |
|---|---|---|---|---|---|
| | | Type | Size | Rate | Source |
| i_Start_s1 | NSSS Step1 enable strobe i_Start_s1 = i_Start (※3) | Int | [1] | Radio-frame | NSSS Detector |

TABLE 5-continued

| Signal Name | Signal Description | Signal Characteristics | | | | |
|---|---|---|---|---|---|
| | | Type | Size | Rate | Source |
| in1920 | Filtered signal at 1.92 MHz | dcomplx | [1] | Sampling Rate | 180-kHz BW Filter |

The following Table 6 shows an output signal for the functional interface of the first processor 410.

TABLE 6

| Signal Name | Signal Description | Signal Characteristics | | | Destination |
|---|---|---|---|---|---|
| | | Type | Size | Rate | |
| buf_rx240_nsss | Extracted FD output data | dcomplx | [132 × 2] | Radio-frame | NSSS Step2 |
| o_Done_s1 | NSSS Step1 finish strobe | Int | [1] | Radio-frame | NSSS Step2 |

Figure 7:
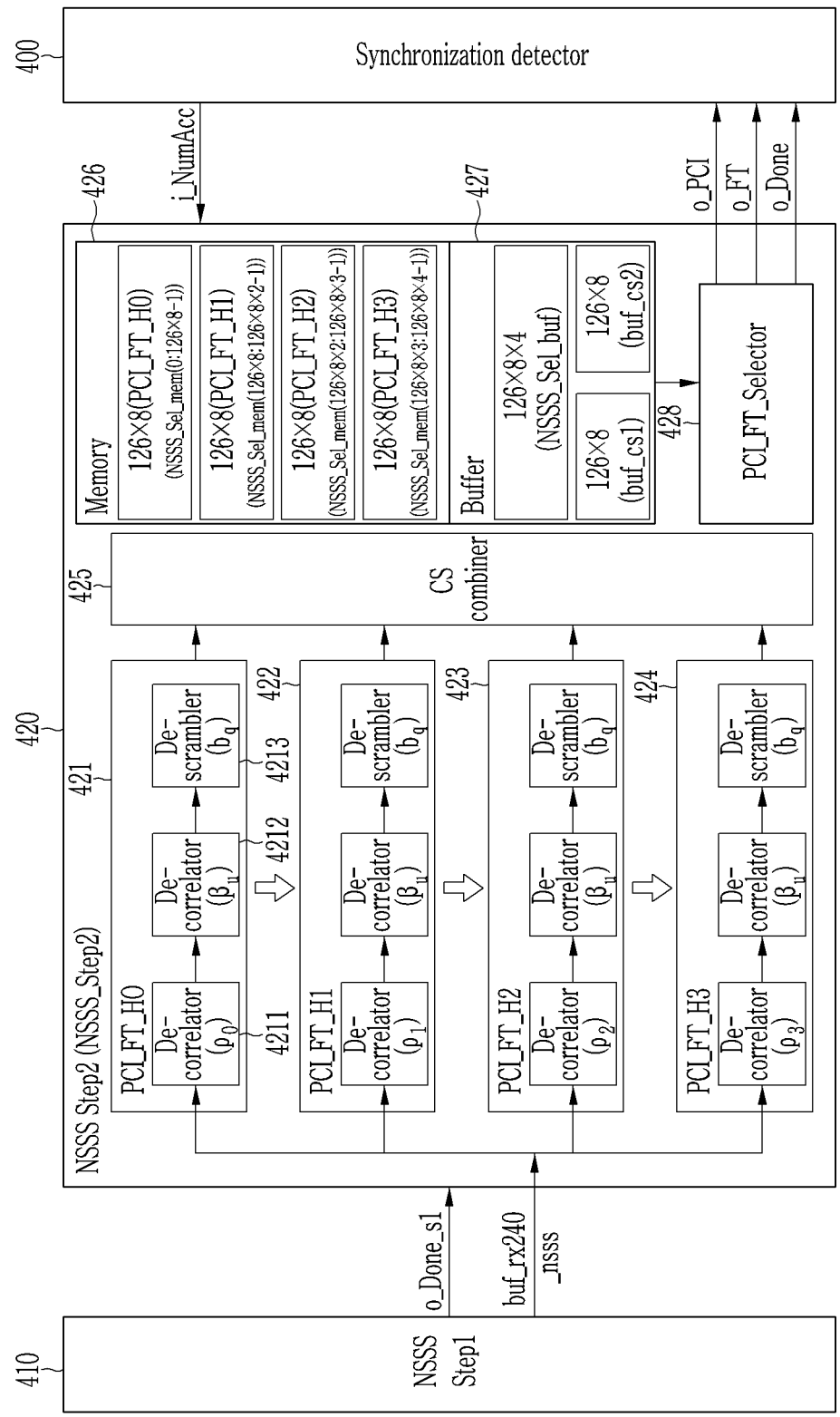
FIG. 7 is a block diagram illustrating a second processor according to an exemplary embodiment of the present invention.

FIG. 7 is a block diagram illustrating the second processor 420 according to the exemplary embodiment of the present invention. The second processor 420 sequentially performs, four times, a hypothesis process on the samples corresponding to the NPSS frequency domain standard signal input from the first processor 410, repeatedly twice in units of 132 samples.

As illustrated in FIG. 7, the second processor 420 according to the exemplary embodiment of the present invention includes a first estimator 421, second estimator 422, a third estimator 423, a fourth estimator 424, a cyclic shift (CS) combiner 425, a memory 426, a buffer 427, and a selector 428. The first estimator 421 may be interchangeably used with term 'PCI_FT_H0', the second estimator 422 may be interchangeably used with term 'PCI_FT_H1', the third estimator 423 may be interchangeably used with term 'PCI_FT_H2', and the fourth estimator 424 may be interchangeably used with term 'PCI_FT_H3'. The second processor 420 is performed by receiving o_Done_s1=ON from the first processor 410.

The first estimator 421 performs decorrelation on a 0-th sequence ($\rho_0(n)$) in the FS sequence shown by the above Equation 4, decorrelation on a ZC sequence shown by the above Equation 2, and descrambling on a scramble sequence shown by the above Equation 3.

The second estimator 422 performs decorrelation on a 1-th sequence ($\rho_1(n)$) in the FS sequence shown by the above Equation 4, decorrelation on a ZC sequence shown by the above Equation 2, and descrambling on a scramble sequence shown by the above Equation 3.

The third estimator 423 performs decorrelation on a 3-th sequence ($\rho_2(n)$) in the FS sequence shown by the above Equation 4, decorrelation on a ZC sequence shown by the above Equation 2, and descrambling on a scramble sequence shown by the above Equation 3.

The fourth estimator 424 performs decorrelation on a 4-th sequence ($\rho_3(n)$) in the FS sequence shown by the above Equation 4, decorrelation on a ZC sequence shown by the above Equation 2, and descrambling on a scramble sequence shown by the above Equation 3.

The CS combiner 425 performs cyclic shift (CS) combining on descrambling values output from the first to fourth estimators 421 to 424, respectively.

The memory 426 accumulates values (i.e., the CS combining values for the first to fourth estimators 421 to 424, respectively) output from the CS combiner 415 by the accumulated number of times (i_NumAcc) transmitted from the synchronization detector 400 and stores the accumulated values, respectively.

The selector 428 compares the stored values for the first to fourth estimators 421 to 424 received from the memory 425, and finally determines the PCI and the 80 ms FT. If the selector 427 finally determines the PCI and the 80 ms FT, it transmits o_Done_s2=ON to the synchronization detector 400.

Meanwhile, the second processor 420 performs decorrelation on the FS sequence of the above Equation 4 for the first to fourth estimators 421 to 424 before the accumulated number of times i_NumAcc received from the synchronization detector 400, decorrelation on the ZC sequence of the above Equation 2, descrambling on the scramble sequence of the above Equation 3, and only CS combining of the CS combiner 425. The second processor 420 finally detects the PCI and the 80 ms FT using the selector 428 if the accumulated number of times i_NumAcc arrives.

As illustrated in FIG. 7, the first estimator 421 according to the exemplary embodiment of the present invention includes a de-correlator 4211, a de-correlator 4212, and a de-scrambler 4213. As illustrated in FIG. 7, the second to fourth estimators 422, 423, and 424 have the same components as the first estimator 421, and for convenience, the first estimator 421 will be described mainly.

The de-correlator 4211 performs the FS sequence decorrelation on a sample (buf_rx240_nsss[•]=y(n), n=0,1, . . . , 131) corresponding to the NSSS frequency domain standard signal input from the first processor 410, as the following Equation 6.

$$y_{S1,p,1}(n)=y_1(n)\rho^*_p(n), n=0,1,\ldots,131, \quad \text{Equation 6}$$

where $y_1$ is the FD signal for the first frame.

$$y_{S1,p,2}(n)=y_2(n)\rho^*_p(n), n=0,1,\ldots,131,$$

where $y_2$ is the FD signal for the second frame.
In the above Equation 6, $\rho_p(n)$ is the same as the above Equation 4 and the above Table 2. As shown in the above Table 2, the sample values are ±1 or ±j, and therefore if only a sign conversion is used instead of a multiplication operation, the above Equation 6 may be calculated only by addition. Meanwhile, the de-correlator 4211 performs the decorrelation on the 0-th sequence ($\rho_0(n)$) among the FS sequence, and therefore in the above Equation 6, $\rho_p(n)$ is replaced by $\rho_0(n)$.

The de-correlator 4212 performs the decorrelation on a ZC sequence $\beta_u(n)$ of the Equation 2. The decorrelation is performed as the following Equation 7.

$$y_{S2,p,u,1}(n)=y_{S1,p,1}(n)\beta^*_u(n)$$

$$y_{S2,p,u,2}(n)=y_{S1,p,2}(n)\beta^*_u(n) \quad \text{Equation 7}$$

As shown by the above Equation 7, the de-correlator 4212 performs the decorrelation using the ZC sequence $\beta_u(n)$ of the above Equation 2 and $y_{S1,p,1}(n)$ and $y_{S1,p,2}(n)$ of the Equation 6.

The de-scrambler 4213 performs the decorrelation on the scrambling sequence $b_q(n)$ of the Equation 3. The decorrelation is performed as the following Equation 8.

$$y_{S3,p,u,q,1}(n)=y_{S2,p,u,1}(n)b_u(n)$$

$$y_{S3,p,u,q,2}(n)=y_{S2,p,u,2}(n)b_u(n) \quad \text{Equation 8}$$

As shown by the above Equation 8, the de-scrambler 4214 performs the decorrelation using the ZC sequence $b_q(n)$ of the above Equation 3 and $y_{S2,p,u,1}(n)$ and $y_{S2,p,u,2}(n)$ of the Equation 7. As shown in the above Table 1, the elements of the scrambling sequence are binary, and therefore if only the sign conversion is used instead of the multiplication operation, the above Equation 8 may be calculated only by the addition.

The CS combiner 425 performs the CS combining as the following Equation 9.

$$y_{S4,p,1}(p*128*8+(u-3)*8+2*q) =$$

$$\left|\sum_{\substack{n=0,p=0\\u=3,q=0}}^{\substack{n=132/2-1,p=3\\u=128,q=3}} y_{S3,p,u,q,1}(n)\right|^2 +$$

$$\left|\sum_{\substack{n=132/2,p=0\\u=3,q=0}}^{\substack{n=131,p=3\\u=128,q=3}} y_{S3,p,u,q,1}(n)\right|^2 \text{ or } \left|\sum_{\substack{n=0,p=0\\u=3,q=0}}^{\substack{n=132/2-1,p=3\\u=128,q=3}} y_{S3,p,u,q,1}(n)\right|^2 +$$

$$\left|\sum_{\substack{n=132/2,p=0\\u=3,q=0}}^{\substack{n=131,p=3\\u=128,q=3}} y_{S3,p,u,q,1}(n)\right|^2 \text{ or } \left|\sum_{\substack{n=0,p=0\\u=3,q=0}}^{\substack{n=132-1,p=3\\u=128,q=3}} y_{S3,p,u,q,1}(n)\right|^2$$

$$\text{or } \left|\sum_{\substack{n=0,p=0\\u=3,q=0}}^{\substack{n=132-1,p=3\\u=128,q=3}} y_{S3,p,u,q,1}(n)\right|$$

$$y_{S4,p,2}(p*128*8+(u-3)*8+2*q+1) =$$

$$\left|\sum_{\substack{n=0,p=0\\u=3,q=0}}^{\substack{n=132/2-1,p=3\\u=128,q=3}} y_{S4,p,u,q,2}(n)\right|^2 +$$

$$\left|\sum_{\substack{n=132/2,p=0\\u=3,q=0}}^{\substack{n=131,p=3\\u=128,q=3}} y_{S4,p,u,q,2}(n)\right|^2 \text{ or } \left|\sum_{\substack{n=0,p=0\\u=3,q=0}}^{\substack{n=132/2-1,p=3\\u=128,q=3}} y_{S3,p,u,q,2}(n)\right|^2 +$$

$$\left|\sum_{\substack{n=132/2,p=0\\u=3,q=0}}^{\substack{n=131,p=3\\u=128,q=3}} y_{S3,p,u,q,2}(n)\right| \text{ or } \left|\sum_{\substack{n=0,p=0\\u=3,q=0}}^{\substack{n=132-1,p=3\\u=128,q=3}} y_{S3,p,u,q,2}(n)\right|^2$$

$$\text{or } \left|\sum_{\substack{n=0,p=0\\u=3,q=0}}^{\substack{n=132-1,p=3\\u=128,q=3}} y_{S3,p,u,q,2}(n)\right|$$

➢ For initializaiton $D_{S4,A,1}(n) = y_{S4,p,1}(n)$, $D_{S4,A,2}(n) = y_{S4,p,2}(n)$ ➢ For non-initializaiton $D_{S4,A,1}(n) = \alpha y_{S4,mod(p-1,4),A-1,1}(n) + (1-\alpha)y_{S4,p,1}(n)$ $D_{S4,A,2}(n) = \alpha y_{S4,mod(p-1,4),A-1,2}(n) + (1-\alpha)y_{S4,p,2}(n)$ Equation 9

In the above Equation 9, α represents a decay factor, and A corresponds to 20 ms as a window size of the synchronization detector 400. In the above Equation 9, mod(−1,4)=3.

The selector 428 acquires specific u, q, and p having the highest correlation value among decision variables derived in the course of the above Equation 9. Here, the PCI may be calculated by (u−3)+q*126 from u and q. The 80 ms FT may be obtained from the information on whether it belongs to the first 132 samples and belongs, to the following 132 samples, through p.

The following Table 7 shows the input signal for the functional interface of the second processor 420.

TABLE 7

| Signal Name | Signal Description | Signal Characteristics | | | |
|---|---|---|---|---|---|
| | | Type | Size | Rate | Source |
| buf_rx240_nsss | Buffered output data from NSSS Step1 | dcomplx | [132 × 2] | Sampling Rate | NSSS Step1 |
| i_NumAcc | Per-20 ms NSSS subframe accumulation num | int | [1] | Radio-frame | NSSS Detector |
| o_Done_s1 | NSSS Step1 finish strobe | int | [1] | Radio-frame | NSSS Step1 |

The following Table 8 shows the output signal for the functional interface of the second processor 420.

TABLE 8

| Signal Name | Signal Description | Signal Characteristics | | | Destination |
|---|---|---|---|---|---|
| | | Type | Size | Rate | |
| o_PCI | Acquired PCI | int | [1] | Radio-frame | NSSS Detector |
| o_FT | Acquired 80 ms FT from NSSS detector 1$^{st}$: FS sequence index 2$^{nd}$: first or second frame | int | [2] | Radio-frame | NSSS Detector |
| o_Done_s2 | NSSS Detector finish strobe | int | [1] | Radio-frame | NSSS Detector |

According to the exemplary embodiment of the present invention, since the complex operation process is not required in the decorrelation process on one of two different sequences transmitted from the transmitting apparatus for the PCI acquisition, and therefore the low-power receiving apparatus can be implemented. According to the exemplary embodiment of the present invention, the complex operation is not required in the decorrelation process on the FT sequence transmitted from the transmitting apparatus for 80 ms acquisition, and therefore the low-power receiving apparatus may be implemented. By doing so, the optimized receiving apparatus may be implemented.

Although the exemplary embodiment of the present invention has been described in detail hereinabove, the scope of the present invention is not limited thereto. That is, several modifications and alterations made by those skilled in the art using a basic concept of the present invention as defined in the claims fall within the scope of the present invention.

What is claimed is:

1. A method for acquiring, by a receiving apparatus, synchronization in the Internet of things based on a secondary synchronization signal received from a transmitting apparatus, the method comprising:

extracting a frequency domain sample by applying channel estimation to a time domain sample of the secondary synchronization signal; and estimating a physical cell ID (PCI) and frame timing (FT) based on decorrelation between a frequency domain standard signal of the secondary synchronization signal and the frequency domain sample, wherein the extracting includes:

removing a cyclic prefix (CP) from the time domain sample;

down-sampling a sample from which the CP is removed; and performing fast Fourier transform (FFT) on the down-sampled sample, wherein the estimating includes:

calculating a first value by performing decorrelation between Fourier series (FS) sequences included in the frequency domain standard signal and the frequency domain sample;

calculating a second value by performing decorrelation between a Zadoff Chu (ZC) sequence included in the frequency domain standard signal and the first value;

calculating a third value by performing decorrelation between a scrambling sequence included in the frequency domain standard signal and the second value; and estimating the PCI and the FT using the first value, the second value, and the third value.

2. The method of claim 1, wherein the estimating further includes calculating a fourth value by performing a cyclic shift (CS) combining on the third value.

3. The method of claim 2, wherein the estimating of the PCI and the FT includes estimating the PCI and the FT using the first to fourth values.

4. The method of claim 2, wherein after the calculating of the first value, the calculating of the second value, the calculating of the third value, and the calculating of the fourth value are repeatedly performed by the accumulated number of times, the estimating of the PCI and the FT is performed.

5. The method of claim 1, wherein:
the first value is calculated only by sign conversion instead of a multiplication operation, and
the third value is calculated only by the sign conversion instead of the multiplication operation.

6. The method of claim 1, wherein the FT is 80 ms FT.

7. A method for acquiring, by a terminal, synchronization in the Internet of things based on a secondary synchronization signal received from a base station, the method comprising:

extracting a frequency domain sample from a time domain sample of the secondary synchronization signal, wherein the extracting includes:

removing a cyclic prefix (CP) from the time domain sample;

down-sampling a sample from which the CP is removed; and performing fast Fourier transform (FFT) on the down-sampled sample; and estimating a physical cell ID (PCI) and 80 ms frame timing (FT) based on decorrelation between a sequence included in a frequency domain standard signal of the secondary synchronization signal and the frequency domain sample, wherein the estimating includes:

calculating a first value by performing decorrelation between Fourier series (FS) sequences included in the frequency domain standard signal and the frequency domain sample;

calculating a second value by performing decorrelation between a Zadoff Chu (ZC) sequence included in the frequency domain standard signal and the first value;

calculating a third value by performing decorrelation between a scrambling sequence included in the frequency domain standard signal and the second value;

calculating a fourth value by performing cyclic shift (CS) combining on the third value; and estimating the PCI and the FT by using the first to fourth values.

8. The method of claim 7, wherein after the calculating of the first value, the calculating of the second value, the calculating of the third value, and the calculating of the fourth value are repeatedly performed by the accumulated number of times, the estimating of the PCI and the FT is performed.

9. The method of claim 7, wherein: the first value is calculated only by an addition calculation instead of a multiplication operation, and the third value is calculated only by an addition calculation instead of the multiplication operation.

10. A receiving apparatus comprising:

an analog-digital converter sampling a secondary synchronization signal received from a transmitting apparatus into a digital signal to generate a first sampling signal;

a filter unit filtering the first sampling signal; and a synchronization detector extracting a frequency domain sample by performing channel estimation on the filtered first sampling signal and estimating a physical cell ID (PCI) and 80 ms frame timing (FT) based on decorrelation between a frequency domain standard signal of the secondary synchronization signal and the frequency domain sample, wherein the synchronization detector:

removes a cyclic prefix (CP) from the first sampling signal;

down-samples a sample from which the CP is removed; and performs fast Fourier transform (FFT) on the down-sampled sample to extract the frequency domain sample, wherein the synchronization detector:

calculates a first value by performing decorrelation between Fourier series (FS) sequences included in the frequency domain standard signal and the frequency domain sample, calculates a second value by performing decorrelation between a Zadoff Chu (ZC) sequence included in the frequency domain standard signal and the first value, calculates a third value by performing decorrelation between a scrambling sequence included in the frequency domain standard signal and the second value, and a fourth value by performing cyclic shift (CS) combining on the third value, and estimates the PCI and the FT by using the first to fourth values.

11. The receiving apparatus of claim 10, wherein the synchronization detector repeatedly calculates the first to fourth values by a predetermined accumulated number of times and then estimates the PCI and the FT.

12. The receiving apparatus of claim 10, wherein the first value is calculated only by an addition calculation instead of a multiplication operation and the third value is calculated only by an addition calculation instead of the multiplication operation.

* * * * *